(12) United States Patent
Walmsley et al.

(10) Patent No.: US 7,744,183 B2
(45) Date of Patent: *Jun. 29, 2010

(54) METHOD OF GENERATING HALFTONE PRINT DATA FOR OVERLAPPING CONSECUTIVE PRINTHEAD SEGMENTS

(75) Inventors: Simon Robert Walmsley, Balmain (AU); Kia Silverbrook, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/423,003

(22) Filed: Apr. 14, 2009

(65) Prior Publication Data

US 2009/0195587 A1    Aug. 6, 2009

Related U.S. Application Data

(63) Continuation of application No. 12/015,243, filed on Jan. 16, 2008, now Pat. No. 7,533,951, which is a continuation of application No. 11/228,410, filed on Sep. 19, 2005, now Pat. No. 7,331,646, which is a continuation of application No. 11/007,319, filed on Dec. 9, 2004, now Pat. No. 7,044,585, which is a continuation of application No. 10/270,153, filed on Oct. 15, 2002, now Pat. No. 6,834,932, which is a continuation of application No. 09/575,117, filed on May 23, 2000, now Pat. No. 6,464,332.

(51) Int. Cl.
*B41J 29/38* (2006.01)
*B41J 2/155* (2006.01)
(52) U.S. Cl. .................................... 347/13

(58) Field of Classification Search ............ 347/13, 347/14, 42
See application file for complete search history.

(56) References Cited

U.S. PATENT DOCUMENTS

| 4,272,771 | A | 6/1981 | Furukawa |
|---|---|---|---|
| 4,977,410 | A | 12/1990 | Onuki et al. |
| 5,384,587 | A | 1/1995 | Takagi et al. |
| 5,450,099 | A | 9/1995 | Stephenson et al. |
| 5,717,448 | A | 2/1998 | Inada |
| 5,767,874 | A | 6/1998 | Wen et al. |
| 6,213,579 | B1 | 4/2001 | Cornell et al. |
| 6,312,099 | B1 | 11/2001 | Hawkins et al. |
| 6,352,329 | B1 | 3/2002 | Watanabe et al. |
| 6,464,332 | B1 | 10/2002 | Silverbrook |

(Continued)

FOREIGN PATENT DOCUMENTS

EP    0034060 A    8/1981

(Continued)

*Primary Examiner*—Julian D Huffman

(57) ABSTRACT

A method of generating halftone print data for overlapping end portions of a pair of consecutive printhead segments in an array of two or more printhead segments. Generally an end portion of a first printhead segment overlaps an end portion of a second printhead segment, in which each printhead segment includes a plurality of ink ejection nozzles. The method includes generating a dither value from a dither matrix, and then combining the dither value with an overlap signal, which represents an extent of overlap of the end portions, to produce an output value. A mathematical operation is then performed on continuous tone print data using a comparator, based on the output value, to produce the half tone data.

12 Claims, 5 Drawing Sheets

U.S. PATENT DOCUMENTS

| | | |
|---|---|---|
| 6,679,576 B2 | 1/2004 | Crivelli |
| 6,834,932 B2 | 12/2004 | Silverbrook |
| 7,044,585 B2 * | 5/2006 | Walmsley et al. ............. 347/42 |
| 7,331,646 B2 | 2/2008 | Walmsley et al. |
| 7,533,951 B2 * | 5/2009 | Walmsley et al. ............. 347/13 |

FOREIGN PATENT DOCUMENTS

| | | | |
|---|---|---|---|
| EP | 0677388 A | 10/1995 | |
| EP | 0709213 A | 5/1996 | |
| EP | 0914950 A | 5/1999 | |
| EP | 0960737 A | 12/1999 | |
| JP | 64-011854 | 1/1989 | |
| JP | 08-230193 | 9/1996 | |
| JP | 09-099594 | 4/1997 | |
| JP | 2000-079707 | 3/2000 | |
| JP | 2000-092323 | 3/2000 | |

* cited by examiner

METHOD OF GENERATING HALFTONE PRINT DATA FOR OVERLAPPING CONSECUTIVE PRINTHEAD SEGMENTS

CROSS REFERENCE TO RELATED APPLICATIONS

The present application is a Continuation Application of U.S. application Ser. No. 12/015,243 filed Jan. 16, 2006, which is a Continuation Application of U.S. application Ser. No. 11/228,410 filed Sep. 19, 2005, now issued U.S. Pat. No. 7,331,646 which is a Continuation Application of U.S. application Ser. No. 11/007,319 filed Dec. 9, 2004, now issued as U.S. Pat. No. 7,044,585, which is a Continuation Application of U.S. application Ser. No. 10/270,153 filed Oct. 15, 2002, now issued U.S. Pat. No. 6,834,932, which is a Continuation of U.S. application Ser. No. 09/575,117 filed May 23, 2000, now issued as U.S. Pat. No. 6,464,332, all of which are herein incorporated by reference.

FIELD OF THE INVENTION

The present invention relates to the field of ink jet printing and in particular discloses a method and apparatus for the compensation for the time varying nozzle misalignment of a print head assembly having overlapping segments.

CO-PENDING APPLICATIONS

Various methods, systems and apparatus relating to the present invention are disclosed in the following co-pending applications filed by the applicant or assignee of the present invention with the present application:

| | | | | |
|---|---|---|---|---|
| 6,428,133 | 6,526,658 | 6,315,399 | 6,338,548 | 6,540,319 |
| 6,328,431 | 6,328,425 | 6,991,320 | 6,383,833 | 6,464,332 |
| 6,390,591 | 7,018,016 | 6,328,417 | 6,322,194 | 6,382,779 |
| 6,629,745 | 09/575,197 | 7,079,712 | 6,825,945 | 7,330,974 |
| 6,813,039 | 6,987,506 | 7,038,797 | 6,980,318 | 6,816,274 |
| 7,102,772 | 7,350,236 | 6,681,045 | 6,728,000 | 7,173,722 |
| 7,088,459 | 09/575,181 | 7,068,382 | 7,062,651 | 6,789,194 |
| 6,789,191 | 6,644,642 | 6,502,614 | 6,622,999 | 6,669,385 |
| 6,549,935 | 6,987,573 | 6,727,996 | 6,591,884 | 6,439,706 |
| 6,760,119 | 7,295,332 | 6,290,349 | 6,428,155 | 6,785,016 |
| 6,870,966 | 6,822,639 | 6,737,591 | 7,055,739 | 7,233,320 |
| 6,830,196 | 6,832,717 | 6,957,768 | 7,456,820 | 7,170,499 |
| 7,106,888 | 7,123,239 | 6,409,323 | 6,281,912 | 6,604,810 |
| 6,318,920 | 6,488,422 | 6,795,215 | 7,154,638 | 6,924,907 |
| 6,712,452 | 6,416,160 | 6,238,043 | 6,958,826 | 6,812,972 |
| 6,553,459 | 6,967,741 | 6,956,669 | 6,903,766 | 6,804,026 |
| 7,259,889 | 6,975,429 | | | |

The disclosures of these co-pending applications are incorporated herein by cross-reference.

BACKGROUND OF THE INVENTION

In the applicant's co-pending application PCT/AU98/00550, a series of ink jet printing arrangements were proposed for printing at high speeds across a page width employing novel ink ejection mechanisms. The disclosed arrangements utilized a thermal bend actuator built as part of a monolithic structure.

In such arrangements, it is desirable to form larger arrays of ink ejection nozzles so as to provide for a page width drop on demand print head. Desirably, a very high resolution of droplet size is required. For example, common competitive printing systems such as offset printing allow for resolutions of one thousand six hundred dots per inch (1600dpi). Hence, by way of example, for an A4 page print head which is eight inches wide, to print at that resolution would require the equivalent of around 12800 ink ejection nozzles for each colour. Assuming a standard four colour process, this equates to approximately fifty one thousand ink ejection nozzles. For a six colour process including the standard four colours plus a fixative and an IR ink this results in 76800 ink ejection nozzles. Unfortunately, it is impractical to make large monolithic print heads from a contiguous segment of substrate such as a silicon wafer substrate. This is primarily a result of the substantial reduction in yield with increasing size of construction. The problem of yield is a well studied problem in the semi-conductor industry and the manufacture of inkjet devices often utilizes semi-conductor or analogous semi-conductor processing techniques. In particular, the field is generally known as Micro Electro Mechanical Systems (MEMS). A survey on the MEMS field is made in the December 1998 IEEE Spectrum article by S Tom Picraux and Paul J McWhorter entitled "The Broad Sweep of Integrated Micro Systems".

One solution to the problem of maintaining high yields is to manufacture a lengthy print head in a number of segments and to abut or overlap the segments together. Unfortunately, the extremely high pitch of ink ejection nozzles required for a print head device means that the spacing between adjacent print head segments must be extremely accurately controlled even in the presence of thermal cycling under normal operational conditions. For example, to provide a resolution of one thousand six hundred dots per inch a nozzle to nozzle separation of about sixteen microns is required.

Ambient conditions and the operational environment of a print head may result in thermal cycling of the print head in the overlap region resulting in expansion and contraction of the overlap between adjacent print head segments which may in turn lead to the production of artifacts in the resultant output image. For example, the temperature of the print head may rise 25° C. above ambient when in operation. The assembly of the print head may also be made of materials having different thermal characteristics to the print head segments resulting in a differential thermal expansion between these components. The silicon substrate may be packaged in elastomer for which the respective thermal expansion coefficients are $2.6 \times 10^{-6}$ and $20 \times 10^{-6}$ microns per degree Celsius.

Artifacts are produced due to the limited resolution of the print head to represent a continuous tone image in a binary form and the ability of the human eye to detect 0.5% differences in colour of adjacent dots in an image.

SUMMARY OF THE INVENTION

It is an object of the present invention to provide for a mechanism for compensating for relative displacement of overlapping print head segments during operation in an effective and convenient manner.

In accordance with a first aspect of the invention there is provided in an ink ejection print head comprising a plurality of overlapping print head segments, wherein the spatial relationship between adjacent segments is variable with time, a method for controlling the firing of nozzles within the overlapped segments comprising the steps of: (a) determining a measure of the overlap between adjacent print head segments; (b) creating a half toning pattern for the nozzles in the region of overlap of the overlapping segments; and (c) adjusting said half toning pattern as a function of said measure in the overlapping regions of said print head segments to reduce artifacts produced by the overlapping of said print head segments.

Preferably, the step for determining a measure of overlap employs a measure of temperature of the print head segments The half toning patterns are preferably produced by means of a dither matrix or dither volume and the alteration can comprise adding an overlap value to a current continuous tone pixel output value before utilizing the dither matrix or dither volume. In place of a measure of temperature a measure of distance can be provided by the use of fiduciary strips on each of the segments and using an interferometric technique to determine the degree of relative movement between the segments.

In accordance with a further aspect of the present invention, there is provided an ink ejection print head system comprising: a plurality of spaced apart spatially overlapping print head segments; at least one means for measurement of the degree of overlap between adjacent print head segments; means for providing a half toning of a continuous tone image and means for adjusting said half toning means in a region of overlap between adjacent print head segments to reduce artifacts between said adjacent segments.

The means for adjusting the half toning means can include a continuous tone input, a spatial overlap input and a binary input, the half toning means utilizing the spatial overlap input to vary the continuous tone input to produce a varied continuous tone input for utilization in a look-up table of a dither matrix or dither volume so as to produce output binary values to adjust for the regions of overlap of print head segments. The means for adjusting the half tone or dither matrix may be implemented in hardware or by means of software employing an algorithm.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE EMBODIMENTS

In a first embodiment, a method of compensation for the temperature varying relative displacement of adjacent print head segments is provided by the utilization of a digital processing mechanism which adjusts for the overlap between adjacent segments.

In a print head covering an A4 page width there may be 10 segments having 9 overlapping portions arranged in a repeating sequence of staggered pairs. Initial alignment of segments can be made within 10 microns using techniques well known in the art of monolithic fabrication techniques. The width of a segment for a 6 colour ink arrangement would be approximately 225 microns assuming the nozzles of a segment are arranged on 16 micron centres in a zig-zag pattern longitudinally.

In this embodiment, a temperature sensor is placed on each print head segment so as to provide for a measure of the current temperature characteristics of each print head segment. The current temperature measurement can then be utilized to determine the amount of overlap between adjacent print head segments.

Alternatively, only a single temperature sensor can be used if it can be assumed that the segments of the print head are sufficiently similar to one another in physical characteristics and performance and that the ambient milieu of each pair of overlapped segment is substantially the same.

The degree of overlap is then used to provide a mechanism for controlling the half toning between adjacent print head segments. It is assumed that outputting of an image in the instant invention is by means of digital half toning employing any method or technique well known in the art. Many different half toning techniques can be utilized and reference is made to the text by Ulichney entitled "Digital Half Toning" published by MIT Press.

Figure 1:
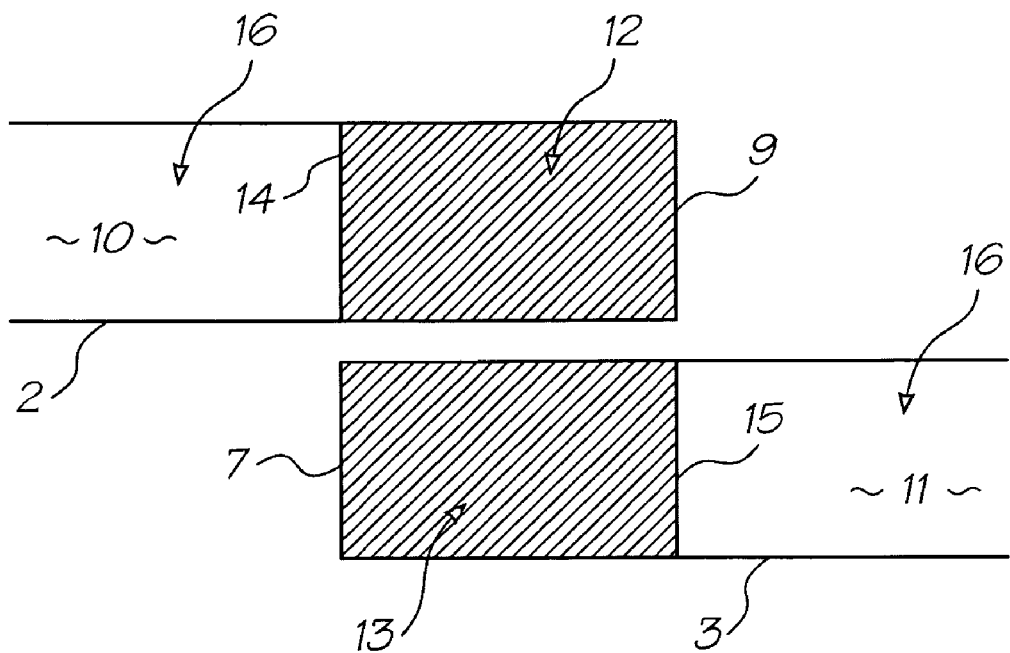
FIG. 1 shows a schematic of a pair of adjacent print head segments according to the invention.

As shown in FIG. 1 adjacent print head segments 2, 3 overlap in the respective regions 12, 13. The overlap region may extend approximately 40 thou (~1 mm.) providing an overlap of 64 nozzles spaced at 16 microns for 1600 dpi resolution.

Figure 7:
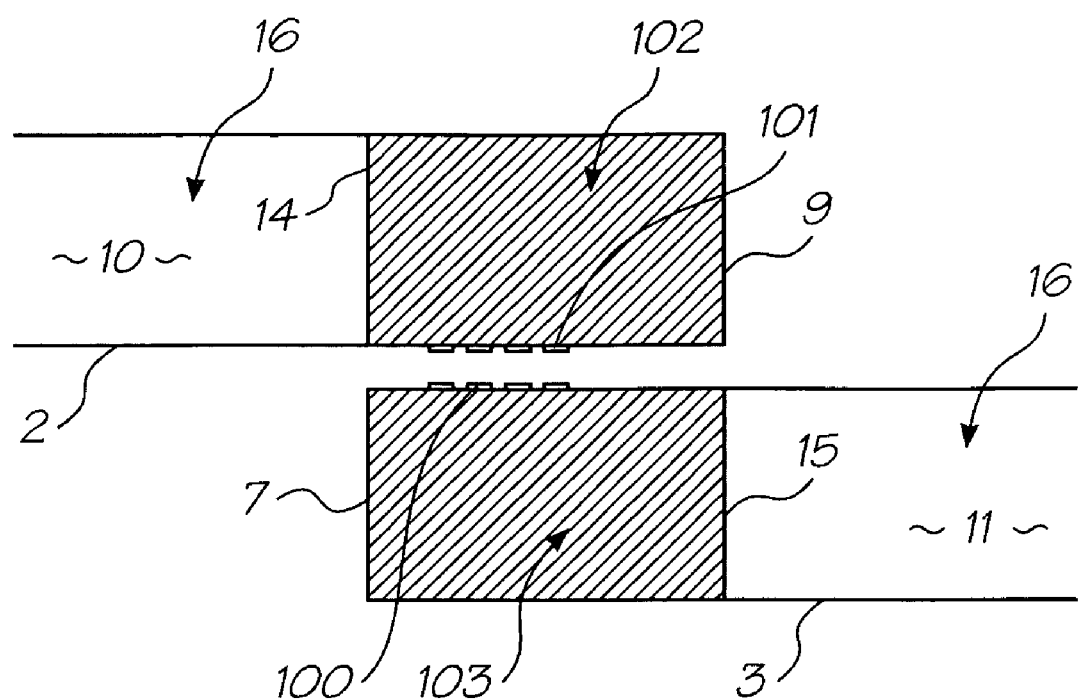
FIG. 7 shows a schematic of a pair of adjacent printhead segments according to a further embodiment of the invention.

A temperature sensor 16 is placed on each print head segment 2, 3 so as to provide for a measure of the current temperature characteristics of each print head segment 2, 3. The current temperature measurement can then be utilized to determine the amount of overlap between adjacent print head segments. Alternatively, fiduciary strips 100, 101 on each overlapped segment 102, 103, as shown in FIG. 7, may be used to measure the degree of relative displacement of the segments 102, 103 by an interferometric technique.

Figure 2:
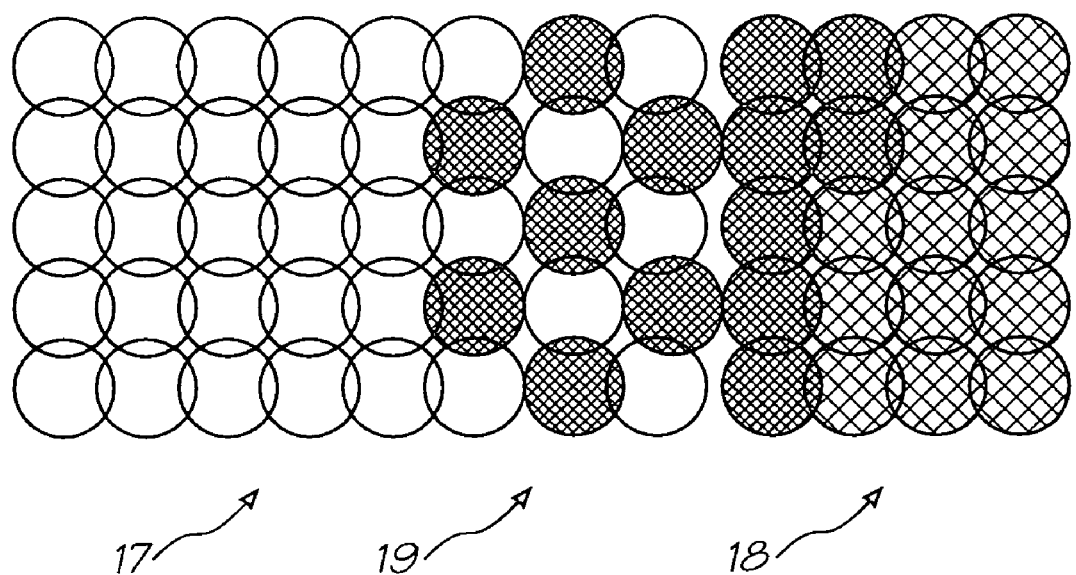
FIG. 2 illustrates the process for printing dots from adjacent print head segments as shown in FIG. 1.

In the region 10 of the segment 2 the nozzles of this segment are used exclusively for the ejection of ink. Similarly in the region 11 of the segment 3 the nozzles of this segment are used exclusively for the ejection of ink. In the overlapping regions 12, 13 a "blend" is provided between the two print head segments 2, 3 such that along the edge 14 of the print head segment 2 nozzles are used exclusively in the region 12 to print and similarly along the edge 15, the nozzles of the segment 3 are used almost exclusively for printing. In between, an interpolation, which can be linear or otherwise, is provided between these two extreme positions. Hence, as shown in FIG. 2, when printing a full colour output on a page the area on the side 17 is printed exclusively by the print head segment 10 while the area 18 is printed exclusively by the print head segment 11 (as illustrated by the black dots) with the area 19 comprising a blend between the nozzles of the two segments. The printing process utilizes any well known half toning matrix such as disclosed in the aforementioned references. While a known half toning matrix is utilized, the actual print head segment utilized will depend upon the blending ratio provided by the measure of overlap between the overlapping segments.

Figure 3:
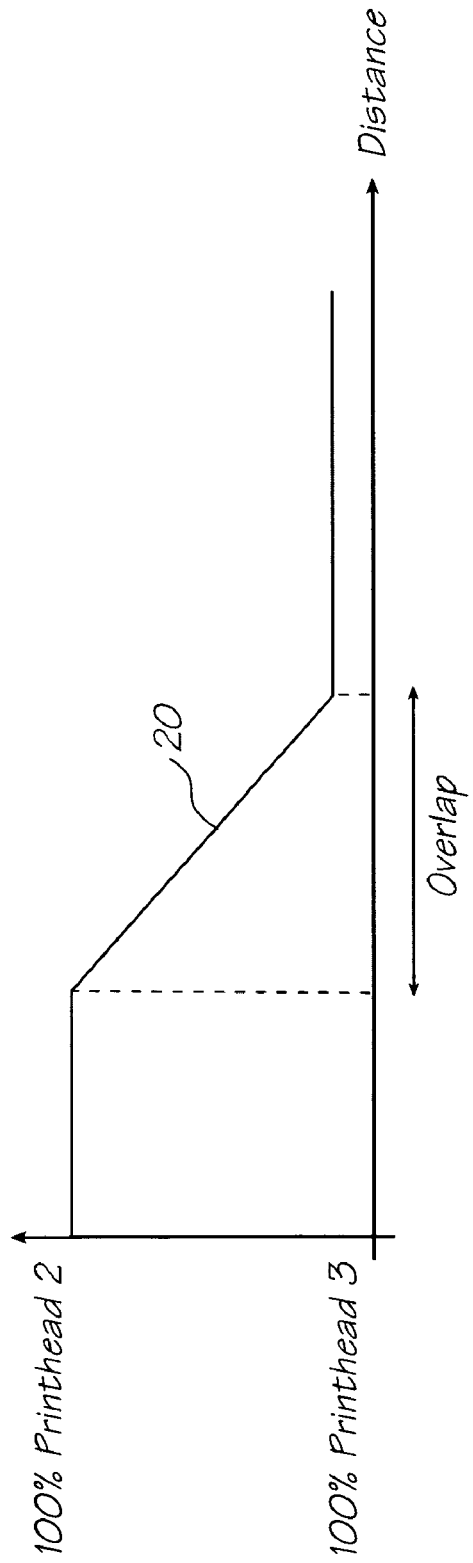
FIG. 3 illustrates a process of blending dots between adjacent print head segments according to the invention.

One such method is illustrated in FIG. 3 where a linear interpolation within the overlapped regions is shown. In the region corresponding to the overlapped section 12 at the edge 14 there is 100% utilization of the nozzles of print head segment 2, whereas in the equivalent region, edge 7, of the print head segment 3 there is zero output. As the distance of the overlap region from the line 14 of the segment 2 is increased towards the line 15 of the segment 3 the proportion of utilization of the nozzles of the section 12 is gradually decreased (linearly), being zero at edge 9 while the utilization of the nozzles of the section 13 is progressively increased to unity by the time the edge 15 is reached. In a first embodiment, where there is an increased overlap between nozzles, the half toning thresholds utilized are increased in the overlap region. This reduces the number of dots printed in the blend region. Conversely, if there is a reduced overlap with the print head segments being spaced apart slightly more than normally acceptable, the dot frequency can be increased by reducing the half toning threshold.

Figure 4:
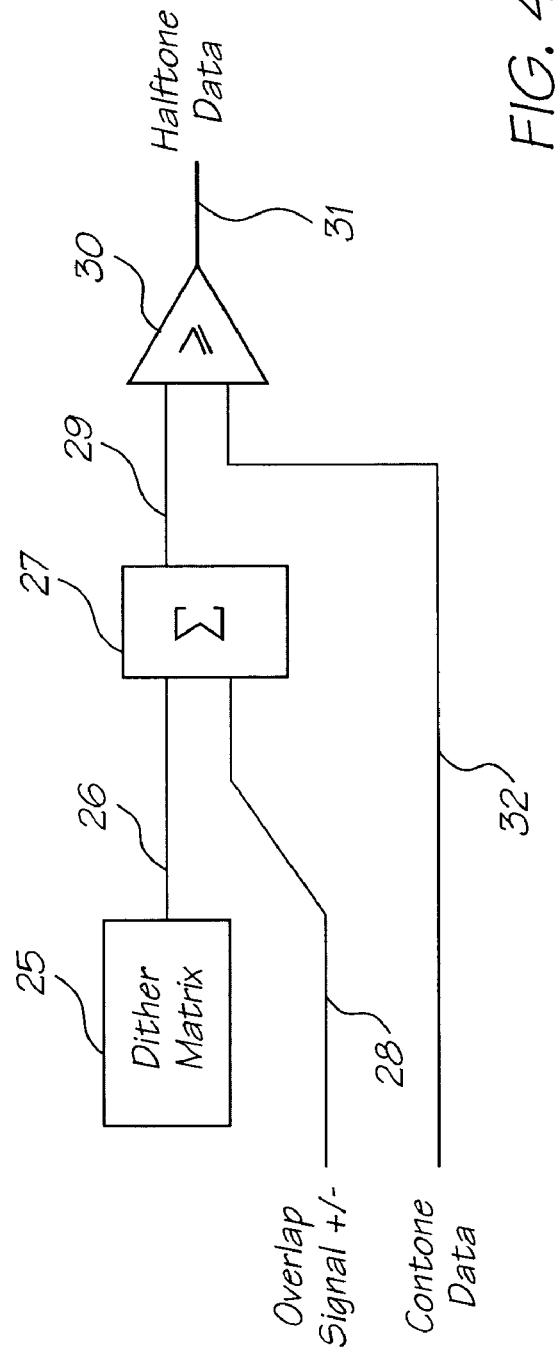
FIG. 4 illustrates a process of dither matrix variational control according to an embodiment of the invention.

An overall general half toning arrangement can be provided as shown in FIG. 4 with a dither matrix 25 outputting a current dither value 26 to a summation means 27 with summation means 27 having another input 28, an overlap signal, which varies in either a positive or a negative sense depending on the degree of overlap between the adjacent segments. The output value 29 of summation means or adder 27 is compared to the input continuous tone data 32 via a comparator 30 so as to output half tone data 31. An alternative arrangement allows that the data value 28 can be subtracted from the continuous tone data 29 before dithering is applied producing similar results. This arrangement is shown in FIG. 5.

Figure 5:
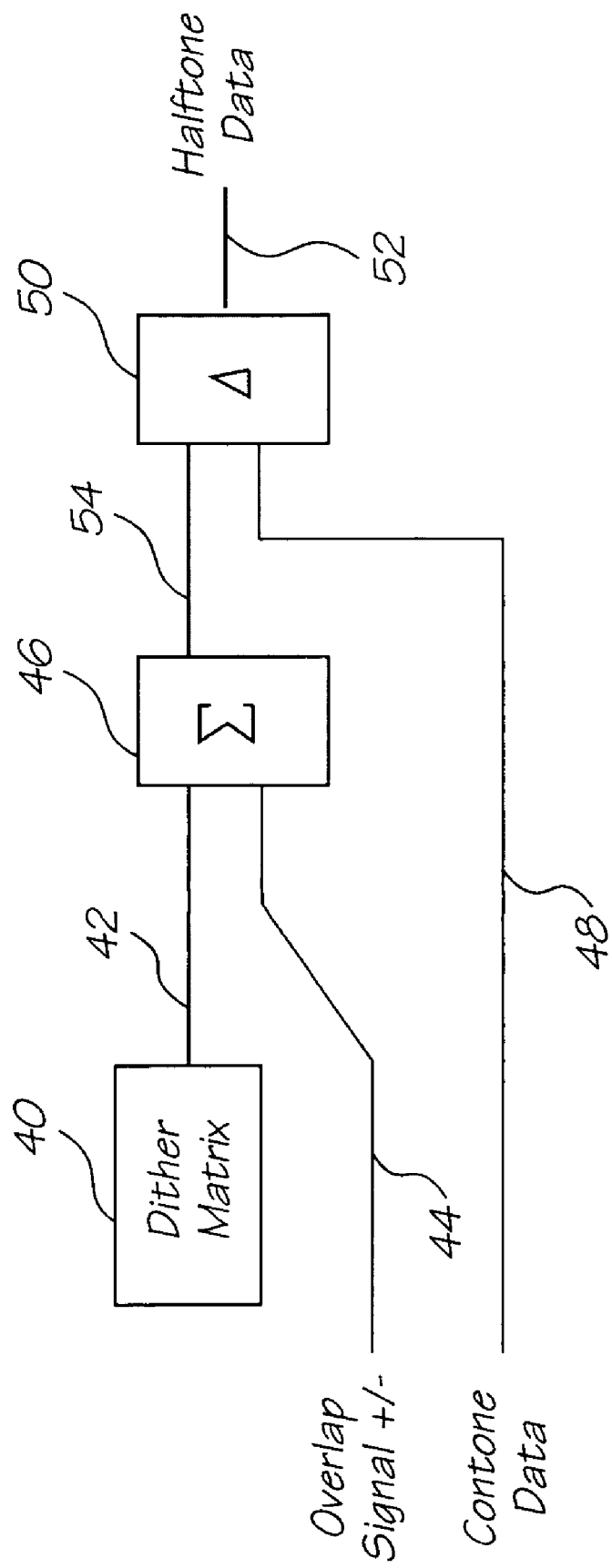
FIG. 5 illustrates a process of dither matrix variational control according to another embodiment of the invention.

As shown in FIG. 5, a halftone data output 52 can be generated by combining the output 42 of dither matrix 40 in an adder 46 with the overlap signal 44, and then taking the difference of the output 54 of adder 46 and the continuous tone data 48 in subtracter 50. This is an equivalent arrangement to that of FIG. 4.

Through the utilization of an arrangement such as described above with respect to FIGS. 3 and 4, a degree of control of the overlap blending can be provided so as to reduce the production of streak artifacts between adjacent print head segments.

As each overlap signal 28 can be multiplied by a calibration factor and added to a calibration offset factor, the degree of accuracy of placement of adjacent print head segments can also be dramatically reduced. Hence, adjacent print head segments can be roughly aligned during manufacture with one another. Test patterns can then be printed out at known temperatures to determine the degree of overlap between nozzles of adjacent segments. Once a degree of overlap has been determined for a particular temperature range a series of corresponding values can be written to a programmable ROM storage device so as to provide full offset values on demand which are individually factored to the print head segment overlap.

A further embodiment of the invention involves the use of a software solution for reducing the production of artifacts between overlapped segments of the print heads. A full software implementation of a dither matrix including the implementation of an algorithm for adjusting variable overlap between print head segments is attached as appendix A. The program is written in the programming language C. The algorithm may be written in some other code mutatis mutandis within the knowledge of a person skilled in the art. The basis of the algorithm is explained as follows.

A dispersed dot stochastic dithering is used to reproduce the continuous tone pixel values using bi-level dots. Dispersed dot dithering reproduces high spatial frequency, that is, image detail, almost to the limits of the dot resolution, while simultaneously reproducing lower spatial frequencies to their full intensity depth when spatially integrated by the eye. A stochastic dither matrix is designed to be free of objectionable low frequency patterns when tiled across the page.

Dot overlap can be modelled using dot gain techniques. Dot gain refers to any increase from the ideal intensity of a pattern of dots to the actual intensity produced when the pattern is printed. In ink jet printing, dot gain is caused mainly by ink bleed. Bleed is itself a function of the characteristics of the ink and the printing medium. Pigmented inks can bleed on the surface but do not diffuse far inside the medium. Dye based inks can diffuse along cellulose fibres inside the medium. Surface coatings can be used to reduce bleed.

Because the effect of dot overlap is sensitive to the distribution of the dots in the same way that dot gain is, it is useful to model the ideal dot as perfectly tiling the page with no overlap. While an actual ink jet dot is approximately round and overlaps its neighbours, the ideal dot can be modelled by a square. The ideal and actual dot shapes thus become dot gain parameters.

Dot gain is an edge effect, that is it is an effect which manifests itself along edges between printed dots and adjacent unprinted areas. Dot gain is proportional to the ratio between the edge links of a dot pattern and the area of the dot pattern. Two techniques for dealing with dot gain are dispersed dot dithering and clustered dot dithering. In dispersed dot dithering the dot is distributed uniformly over an area, for example for a dot of 50% intensity a chequer board pattern is used. In clustered dot dithering the dot is represented with a single central "coloured" area and an "uncoloured" border with the ratio of the area of "coloured" to "uncoloured" equaling the intensity of the dot to be printed. Dispersed dot dithering is therefore more sensitive to dot gain than clustered dot dithering.

Two adjacent print head segments have a number of overlapping nozzles. In general, there will not be perfect registration between corresponding nozzles in adjacent segments. At a local level there can be a misregistration of plus or minus half the nozzle spacing, that is plus or minus about 8 microns at 1600 dpi. At a higher level, the number of overlapping nozzles can actually vary.

The first approach to smoothly blending the output across the overlap bridge and from one segment to the next consists of blending the continuous tone input to the two segments from one to the other across the overlap region. As output proceeds across the overlap region, the second segment receives an increasing proportion of the input continuous tone value and the first segment receives a correspondingly decreasing proportion as described above with respect to FIG. 3. A linear or higher order interpolation can be used. The dither matrices used to dither the output through the two segments are then registered at the nozzle level.

The first approach has two drawbacks. Firstly, if the dither threshold at a particular dot location is lower than both segments' interpolated continuous tone values then both segments will produce a dot for that location. Since the two dots will overlap, the intensities promised by the two dither matrices will be only partially reproduced, leading to a loss of overall intensity. This can be remedied by ensuring that corresponding nozzles never both produce a dot. This can also be achieved by using the inverse of the dither matrix for alternating segments, or dithering the continuous tone value through a single dither matrix and then assigning the output dot to one or the other nozzle stochastically, according to a probability given by the current interpolation factor.

Secondly, adjacent dots printed by different segments will overlap again leading to a loss of overall intensity.

Figure 6:
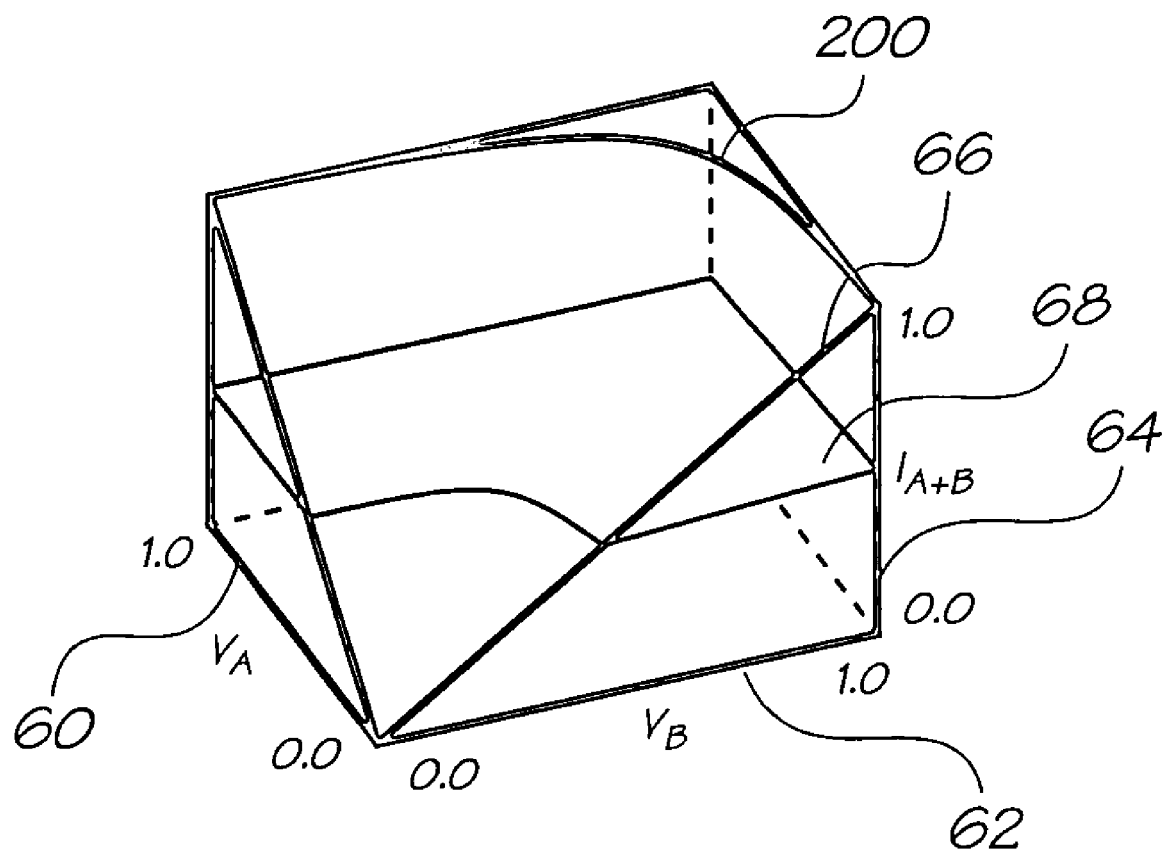
FIG. 6 illustrates graphically an algorithm implementing a further process of dither matrix variational control according to a further embodiment of the invention.

As shown in FIG. 6, the value for each overlapped segment is plotted along the horizontal axes 60, 62 as $V_A$ and $V_B$ respectively between the values of 0.0 and 1.0. The calculated output 66 is plotted with respect to the vertical axis 64 as a function, $I_{A+B}$, for values ranging from 0.0 to 1.0. A contour plane 68 shows the resultant values for $I_{A+B}=0.5$.

FIG. 6 shows the qualitative shape of the three dimensional function linking the two segments' input continuous tone values $V_A$ and $V_B$ to the observed output intensity $I_{A+B}$. For the first approach, an input continuous tone value V and an interpolation factor f together yield $V_A=(1-f)V$ and $V_B=fV$. The closer the interpolation factor is to 0.5 the greater the difference between the input continuous tone value and the observed output intensity. For V=1.0, this is illustrated in FIG. 6 by the curve 200 on the vertical $V_A+V_B=1.0$ plane. By definition this curve lies on the function surface. FIG. 6 indicates that when any kind of mixing occurs, that is 0.0<f<1.0, the output intensity is attenuated, and to achieve the desired output intensity the sum of the two segments' input values must exceed the desired output value, that is $V_A+V_B>V$. This forms the basis for the algorithm in appendix A.

The function shows a linear response when only one segment contributes to the output, that is f=0.0 or f=1.0. This assumes of course that the dither matrix includes the effects of dot gain.

The foregoing description has been limited to specific embodiments of this invention. It will be apparent, however, that variations and modifications may be made to the invention, with the attainment of some or all of the advantages of the invention. For example, it will be appreciated that the invention may be embodied in either hardware or software in a suitably programmed digital data processing system, both of which are readily accomplished by those of ordinary skill in the respective arts. Therefore, it is the object of the appended claims to cover all such variations and modifications as come within the true spirit and scope of the invention.

APPENDIX A

A full software implementation of a dither matrix including the implementation of an algorithm for adjusting variable overlap between print head segments is provided below. The program is written in the programming language C.

```
static
void
ObtainMisregistrationTransferFunction
(
        int dotsPerPixel,
        int subdotsPerDot,
        BI_Image const& dotImage,
        char const* pDotImageName,
        char const* pRefDotImageName,
        int const overlapSize,
        int const overlapIndex,                         // 0 .. overlapSize-1
        int const misregFactor,
        BI_Image const& ditherMatrix,
        BI_LUT& lutv,
        BI_LUT& lut0,
        BI_LUT& lut1
);

class RLE_DotLine
{
public:
                        RLE_DotLine()
                                : m_whiteRun(0), m_blackRun(0) {}
                        RLE_DotLine(int whiteRun, int blackRun)
                                : m_whiteRun(whiteRun), m_blackRun(blackRun) {}
        int             WhiteRun() const { return m_whiteRun; }
        int             BlackRun() const { return m_blackRun; } private:
        int             m_whiteRun;
```

```
        int             m_blackRun;
};
typedef vector<RLE_DotLine, allocator<RLE_DotLine> > RLE_Dot;

static
void
Usage()
{
        fprintf(stderr, "usage: SegmentDither\n");
        fprintf(stderr, "       inputImage\n");
        fprintf(stderr, "       dotsPerPixel\n");
        fprintf(stderr, "       subdotsPerDot\n");
        fprintf(stderr, "       dotImage\n");
        fprintf(stderr, "       refDotImage\n");
        fprintf(stderr, "       overlapCenter\n");
        fprintf(stderr, "       overlapSize\n");
        fprintf(stderr, "       misregFactor\n");
        fprintf(stderr, "       ditherMatrix\n");
        fprintf(stderr, "       outputImage\n");
        fprintf(stderr, "       outputResolution\n");
        exit(1);
} static
void
BadArgument(char const* pErrorMsg)
{
        fprintf(stderr, "SegmentDither: argument error: %s\n", pErrorMsg);
        exit(1);
} define CHECK_ARGUMENT(cond) if (cond) BadArgument(#cond)

static
double
MisregDots(int const misregFactor)
{
        return (double)misregFactor / 1000;
} static
int
MisregSubdots(int const misregFactor, int const subdotsPerDot)
{
        return (int)BU_Round(MisregDots(misregFactor) * subdotsPerDot);
} static
void
```

```
PutDot
(
        int const subdotsPerDot,
        RLE_Dot const& rleDot,
        int const dotRow,
        int const dotCol,
        int const misregFactor,
        BI_Image& outputImage
)
{
        int const misregSubdots = MisregSubdots(misregFactor, subdotsPerDot);
        int const subdotRow = dotRow * subdotsPerDot;
        int const subdotCol = dotCol * subdotsPerDot;

int const dotOverlap = rleDot.size() - subdotsPerDot;
        int const dotMargin = dotOverlap / 2;

RLE_Dot::const_iterator ii = rleDot.begin();
        for (int i = 0; i < rleDot.size(); i++, ii++)
        {
                int const row = subdotRow - dotMargin + i;
                if (row < 0 || row >= outputImage.Height())
                        continue;

int const whiteRun = (*ii).WhiteRun();
                int blackRun = (*ii).BlackRun();

int col = subdotCol - dotMargin + whiteRun + misregSubdots;
                if (col < 0)
                {
                        blackRun += col;
                        col = 0;
                }
                if (col + blackRun >= outputImage.Width())
                        blackRun = outputImage.Width() - col;
                if (blackRun <= 0)
                        continue;

BU_ExpandBitRun
                (
                        outputImage.Image(row),
                        col,
                        outputImage.Width(),
                        blackRun,
                        1
                );
        }
}
```

```
static
void
MergeScale
(
        double const scale,
        int& v,
        double& f0,
        double& f1
)
{
        double const vScaled = (double)v * scale;
        if (vScaled <= 255.0)
        {
                v = (int)BU_Round(vScaled);
        }
        else
        {
                v = 255;
                double const fScale = vScaled / 255.0;
                f0 *= fScale;
                f1 *= fScale;
        }
} static
void
Dither
(
        BI_Image const& inputImage,
        BI_LUT const& lutDotGain,
        int const dotsPerPixel,
        int const subdotsPerDot,
        BI_Image const& dotImage,
        char const* pDotImageName,
        char const* pRefDotImageName,
        int const overlapCenter,
        int const overlapSize,
        int const misregFactor,
        BI_Image const& ditherMatrix,
        BI_Image& outputImage,
        int const outputResolution,
        bool const bRetain,
        bool const bSkipLHS,
        bool const bSkipRHS,
        bool const bFixedInterp = false,
        double const fixedF0 = 0,
        double const fixedF1 = 0
)
{
```

```
// compute overlap interval
int const overlapStart = overlapCenter - (overlapSize / 2);
int const overlapEnd = overlapStart + overlapSize - 1;

// copy and invert dither matrix
BI_Image ditherMatrix2;
ditherMatrix2 = ditherMatrix;
BI_Invert(ditherMatrix2);

// initialise and clear output image
int const subdotsPerPixel = dotsPerPixel * subdotsPerDot;
int const bilevelHeight = inputImage.Height() * subdotsPerPixel;
int const bilevelWidth = inputImage.Width() * subdotsPerPixel;
if (!bRetain)
{
        // initialise
        outputImage.Initialise
        (
                BI_ColorModel(BI_ColorGrayscale, 1),
                bilevelHeight,
                bilevelWidth,
                outputResolution,
                outputResolution
        );

// clear
        BI_CC* pOutputRow = outputImage.Image();
        for (int j = 0; j < outputImage.Height(); j++)
        {
                BU_ClearLine(pOutputRow, outputImage.Width());
                pOutputRow += outputImage.RowSize();
        }
}

// convert dot image to RLE
RLE_Dot rleDot;
for (int i = 0; i < dotImage.Height(); i++)
{
        int const whiteRun = BU_GetBitRun
        (
                dotImage.Image(i),
                0,
                dotImage.Width(),
                0 // white
        );
        int blackRun;
        if (whiteRun == dotImage.Width())
        {
                blackRun = 0;
```

```
                }
                else
                {
                        blackRun = BU_GetBitRun
                        (
                                dotImage.Image(i),
                                whiteRun,
                                dotImage.Width(),
                                1 // black
                        );
                }
                rleDot.push_back(RLE_DotLine(whiteRun, blackRun));
        }

// dither contone input image to bi-level output image
        BI_CC const* pImage = inputImage.Image();
        BI_CC const* pRow = pImage;
        BI_CC const* pDither = ditherMatrix.Image();
        BI_CC const* pDitherRow = pDither;
        BI_CC const* pDither2 = ditherMatrix2.Image();
        BI_CC const* pDitherRow2 = pDither2;
        int ditherRow = 0;
        for (int row = 0; row < inputImage.Height(); row++)
        {
                for (int dotRow = 0; dotRow < dotsPerPixel; dotRow++)
                {
                        int const globalDotRow = (row * dotsPerPixel) + dotRow;
                        BI_CC const* pPixel = pRow;
                        BI_CC const* pDitherPixel = pDitherRow;
                        BI_CC const* pDitherPixel2 = pDitherRow2;
                        int ditherCol = 0;
                        for (int col = 0; col < inputImage.Width(); col++)
                        {
                                int const vRaw = *pPixel++;
                                int const vDotGain = lutDotGain[vRaw];
                                for (int dotCol = 0; dotCol < dotsPerPixel; dotCol++)
                                {
                                        int vRawDot = vRaw;
                                        int const t0 = *pDitherPixel;
                                        int const t1 = t0; //*pDitherPixel2;

int const globalDotCol = (col * dotsPerPixel) + dotCol;

// interpolate intensities in overlap region and dither
                                        // one or the other or both
                                        if (!bFixedInterp && globalDotCol < overlapStart)
                                        {
                                                int const t = t0;
```

```
                    if ((vDotGain == 255) || (vDotGain >= t &&
vDotGain != 0))
                    {
                            if (!bSkipLHS)
                            {
                                    PutDot
                                    (
                                            subdotsPerDot,
                                            rleDot,
                                            globalDotRow,
                                            globalDotCol,
                                            0,
                                            outputImage
                                    );
                            }
                    }
            }
            else
            if (!bFixedInterp && overlapEnd < globalDotCol)
            {
                    int const t = (overlapSize == 0) ? t0 : t1;
                    if ((vDotGain == 255) || (vDotGain >= t &&
vDotGain != 0))
                    {
                            if (!bSkipRHS)
                            {
                                    PutDot
                                    (
                                            subdotsPerDot,
                                            rleDot,
                                            globalDotRow,
                                            globalDotCol,
                                            misregFactor,
                                            outputImage
                                    );
                            }
                    }
            }
            else
            {
                    // account for stretch or shrink
                    if (!bFixedInterp)
                    {
                            double const misregDots =
MisregDots(misregFactor);
                            double const newOverlapSize =
overlapSize + misregDots;
#if 1
```

```
newOverlapSize / overlapSize;

* overlapScale);

f0, f1);

endif if 1
```

```
                double const overlapScale = vRawDot = (int)BU_Round(vRawDot if (vRawDot > 255)
                        vRawDot = 255;
                //MergeScale(overlapScale, vRawDot,

}

// compute interpolation factors
        double f0, f1;
        if (bFixedInterp)
        {
                f0 = fixedF0;
                f1 = fixedF1;
        }
        else
        {
                // compute overlap index
                int const overlapIndex =
                        globalDotCol - overlapStart;

// obtain misregistration LUTs
                BI_LUT lutv;
                BI_LUT lut0;
                BI_LUT lut1;
                ObtainMisregistrationTransferFunction
                (
                        dotsPerPixel,
                        subdotsPerDot,
                        dotImage,
                        pDotImageName,
                        pRefDotImageName,
                        overlapSize,
                        overlapIndex,
                        misregFactor,
                        ditherMatrix,
                        lutv,
                        lut0,
                        lut1
                );

// retrieve interpolation factors
                f0 = (double)lut0[vRawDot] / 255;
                f1 = (double)lut1[vRawDot] / 255;
```

```
                        if (globalDotCol > overlapCenter)
                            BU_Swap(f0, f1);

// adjust intensity for attenuation
                        vRawDot = lutv[vRawDot];
                    }
endif // diagnostics
                    //printf("f0=%5.1lf f1=%5.1lf (%5.1lf) vRaw=%d v=%d\n",
                    //        f0, f1, f0 + f1, vRaw, vRawDot);

// interpolate dither with jitter
                    int vd = 0;
                    int v0d = 0;
                    int v1d = 0;
                    if ((vRawDot == 255) || (vRawDot >= t0 && vRawDot != 0))
                    {
                        vd = 1;
                    } double const rr = (double)rand() / RAND_MAX;

if (vd && rr < f0)
                    {
                        v0d = 1;
                        if (!bSkipLHS)
                        {
                            PutDot
                            (
                                subdotsPerDot,
                                rleDot,
                                globalDotRow,
                                globalDotCol,
                                0,
                                outputImage
                            );
                        }
                    } if (vd && (1.0 - rr) <= f1)
                    {
                        v1d = 1;
                        if (!bSkipRHS)
                        {
                            PutDot
                            (
```

```
                                        subdotsPerDot,
                                        rleDot,
                                        globalDotRow,
                                        globalDotCol,
                                        misregFactor,
                                        outputImage
                                    );
                                }
                            }
#if 0
                            if (globalDotRow == 864)
                            {
                                printf("%1d %1d %1d (%3d %3d %3d
%3d) ",
                                    vd, v0d, v1d, vRawDot, v0, v1,
v0 + v1);

if (v0d + v1d < vd)
                                    printf("?");
                                if (v0d + v1d > vd)
                                    printf("#");
                                printf("\n");
                            }
endif
                        } pDitherPixel++;
                        pDitherPixel2++;
                        ditherCol++;
                        if (ditherCol >= ditherMatrix.Width())
                        {
                            pDitherPixel = pDitherRow;
                            pDitherPixel2 = pDitherRow2;
                            ditherCol = 0;
                        }
                    }
                }
                pDitherRow += ditherMatrix.RowSize();
                pDitherRow2 += ditherMatrix2.RowSize();
                ditherRow++;
                if (ditherRow >= ditherMatrix.Height())
                {
                    pDitherRow = pDither;
                    pDitherRow2 = pDither2;
                    ditherRow = 0;
                }
            }
            pRow += inputImage.RowSize();
        }
    }
}
```

```
static
void
ChangeFileSuffix
(
        char const* pPath,
        char const* pSuffix,
        char const* pExt,
        char path[_MAX_PATH]
)
{
        char drive[_MAX_DRIVE];
        char dir[_MAX_DIR];
        char fname[_MAX_FNAME];
        char ext[_MAX_EXT];
        _splitpath(pPath, drive, dir, fname, ext);
        strcat(fname, pSuffix);
        _makepath(path, drive, dir, fname, pExt);
} static
void
LogTransferFunction(char const* pType, double const intensity[], int const v)
{
        printf("%s: %03d : %5.1lf (%5.1lf)\n",
                pType, v, intensity[v], v - intensity[v]);
} static
void
ComputeMisregistrationTransferFunction
(
        int dotsPerPixel,
        int subdotsPerDot,
        BI_Image const& dotImage,
        char const* pDotImageName,
        double const f0,
        double const f1,
        int const misregFactor,
        BI_Image const& ditherMatrix,
        BI_LUT& lutv,
        BI_LUT& lut0,
        BI_LUT& lut1
)
{
        // create test image
        BI_Image testImage;
        testImage.Initialise
        (
```

```
            BI_ColorModel(BI_ColorGrayscale),
            ditherMatrix.Height(),
            ditherMatrix.Width()
);

// build identity transfer function
BI_LUT identityLut;
for (int v = 0; v < 256; v++)
        identityLut[v] = v;

// create output image
BI_Image outputImage;

// compute intensity for each gray level
double intensity[512];
int vLast;
for (v = 0; v < 512; v++)
{
        // compute extended interpolation factors
        double f0x, f1x;
        int vx;
        if (v <= 255)
        {
                vx = v;
                f0x = f0;
                f1x = f1;
        }
        else
        {
                vx = 255;
                double const fScale = (double)v / 255.0;
                f0x = f0 * fScale;
                f1x = f1 * fScale;
        }

// set test image to next intensity
        testImage = BI_Color((BI_CC)vx);

// dither test image to bi-level output
        Dither
        (
                testImage,
                identityLut,
                dotsPerPixel,
                subdotsPerDot,
                dotImage,
                pDotImageName,
                pDotImageName,
                0, 0,                           // no explicit overlap
```

```
            misregFactor,
            ditherMatrix,
            outputImage,
            72,                             // output resolution
            false,                          // don't retain output image
            false,                          // don't skip LHS
            false,                          // don't skip RHS
            true,                           // fixed interpolation
            f0x,
            f1x
    );

// determine intensity of dithered bi-level output
    long nDots = 0;
    BI_CC const* pRow = outputImage.Image();
    for (int row = 0; row < outputImage.Height(); row++)
    {
            nDots += BU_CountBits(pRow, 0, outputImage.Width());
            pRow += outputImage.RowSize();
    }
    intensity[v] = 255 * (double)nDots / outputImage.PixelCount();
    //LogTransferFunction("misreg", intensity, v);

vLast = v;
    if (intensity[v] >= 255)
            break;
}
LogTransferFunction("misreg", intensity, 1);
LogTransferFunction("misreg", intensity, vLast);

// create LUTs
for (int x = 0; x < 256; x++)
{
    double d = -1;
    for (v = 0; v <= vLast; v++)
    {
            double const d2 = BU_Abs(intensity[v] - x);
            if (d < 0 || d2 < d)
            {
                    d = d2;
                    if (v <= 255)
                    {
                            lutv[x] = v;
                            int const k0 = (int)BU_Round(f0 * 255);
                            lut0[x] = (BI_CC)BU_Min(k0, 255);
                            int const k1 = (int)BU_Round(f1 * 255);
                            lut1[x] = (BI_CC)BU_Min(k1, 255);
                    }
                    else
```

```
                {
                        lutv[x] = 255;
                        int const k0 = (int)BU_Round(f0 * v);
                        lut0[x] = (BI_CC)BU_Min(k0, 255);
                        int const k1 = (int)BU_Round(f1 * v);
                        lut1[x] = (BI_CC)BU_Min(k1, 255);
                        if (k0 > 255 || k1 > 255)
                        {
                                fprintf(stderr, "k0=%d k1=%d (x=%d v=%d f0=%5.1lf f1=%5.1lf\n",
                                        k0, k1, x, v, f0, f1);
                        }
                }
            }
          }
        }
    }
} static
void
SimplifyFraction(int& n, int& d)
{
    for (int i = n; i > 1 && n > 1; --i)
    {
        if ((d % i) == 0)
        {
            if ((n % i) == 0)
            {
                n /= i;
                d /= i;
            }
        }
    }
} static
void
ObtainMisregistrationTransferFunction
(
    int dotsPerPixel,
    int subdotsPerDot,
    BI_Image const& dotImage,
    char const* pDotImageName,
    char const* pRefDotImageName,
    int const overlapSize,
    int const rawOverlapIndex,        // 0 .. overlapSize-1
    int const misregFactor,
    BI_Image const& ditherMatrix,
    BI_LUT& lutv,
```

```
    BI_LUT& lut0,
    BI_LUT& lut1
)
{

// normalize overlap index
    int overlapIndex = rawOverlapIndex;
    if (overlapIndex >= ((overlapSize + 1) / 2))
            overlapIndex = (overlapSize - 1) - overlapIndex;

char lutvName[_MAX_PATH];
    char lut0Name[_MAX_PATH];
    char lut1Name[_MAX_PATH];
    char suffix[_MAX_FNAME];

int interpNum = overlapIndex + 1;
    int interpDenom = overlapSize + 1;
    SimplifyFraction(interpNum, interpDenom);

sprintf(suffix, "_%03d_%02d_%02d",
            BU_Abs(misregFactor), interpNum, interpDenom);
    ChangeFileSuffix(pRefDotImageName, suffix, ".amp", lutvName);

sprintf(suffix, "_%03d_%02d_%02d_0",
            BU_Abs(misregFactor), interpNum, interpDenom);
    ChangeFileSuffix(pRefDotImageName, suffix, ".amp", lut0Name);

sprintf(suffix, "_%03d_%02d_%02d_1",
            BU_Abs(misregFactor), interpNum, interpDenom);
    ChangeFileSuffix(pRefDotImageName, suffix, ".amp", lut1Name);

try
    {
            BU_File lutvFile(lutvName, _O_BINARY | _O_RDONLY);
            lutv.Load(lutvFile);
            BU_File lut0File(lut0Name, _O_BINARY | _O_RDONLY);
            lut0.Load(lut0File);
            BU_File lut1File(lut1Name, _O_BINARY | _O_RDONLY);
            lut1.Load(lut1File);
    }
    catch (...)
    {
            // if using a reference dot image, LUTs must already exist
            if (strcmp(pDotImageName, pRefDotImageName) != 0)
            {
                    fprintf(stderr, "can't load %s or %s or %s\n",
                            lutvName, lut0Name, lut1Name);
                    exit(1);
            }
```

```
        // determine interpolation factors
        double f1 = (double)interpNum / interpDenom;
        double f0 = 1.0 - f1;

ComputeMisregistrationTransferFunction
        (
            dotsPerPixel,
            subdotsPerDot,
            dotImage,
            pDotImageName,
            f0,
            f1,
            BU_Abs(misregFactor),
            ditherMatrix,
            lutv,
            lut0,
            lut1
        );
        BU_File lutvFile(lutvName, _O_BINARY | _O_WRONLY | _O_CREAT);
        lutv.Save(lutvFile);
        BU_File lut0File(lut0Name, _O_BINARY | _O_WRONLY | _O_CREAT);
        lut0.Save(lut0File);
        BU_File lut1File(lut1Name, _O_BINARY | _O_WRONLY | _O_CREAT);
        lut1.Save(lut1File);
    }
} static
void
ComputeDotGainTransferFunction
(
    int dotsPerPixel,
    int subdotsPerDot,
    BI_Image const& dotImage,
    char const* pDotImageName,
    BI_Image const& ditherMatrix,
    BI_LUT& lutDotGain
)
{
    // create test image
    BI_Image testImage;
    testImage.Initialise
    (
        BI_ColorModel(BI_ColorGrayscale),
        ditherMatrix.Height(),
        ditherMatrix.Width()
    );

// build identity transfer function
```

```
BI_LUT identityTransferFunction;
for (int v = 0; v < 256; v++)
        identityTransferFunction[v] = v;

// create output image
BI_Image outputImage;

// compute intensity for each gray level
double intensity[256];
for (v = 0; v < 256; v++)
{
        // set test image to next intensity
        testImage = BI_Color((BI_CC)v);

// dither test image to bi-level output
        Dither
        (
                testImage,
                identityTransferFunction,
                dotsPerPixel,
                subdotsPerDot,
                dotImage,
                pDotImageName,
                pDotImageName,
                0, 0,                           // no overlap
                0,                              // no misregistration
                ditherMatrix,
                outputImage,
                72,                             // output resolution
                false,                          // don't retain output image
                false,                          // don't skip LHS
                false                           // don't skip RHS
        );

// determine intensity of dithered bi-level output
        long nDots = 0;
        BI_CC const* pRow = outputImage.Image();
        for (int row = 0; row < outputImage.Height(); row++)
        {
                nDots += BU_CountBits(pRow, 0, outputImage.Width());
                pRow += outputImage.RowSize();
        }
        intensity[v] = 255 * (double)nDots / outputImage.PixelCount();
        //LogTransferFunction("dot gain", intensity, v);
}
LogTransferFunction("dot gain", intensity, 1);
LogTransferFunction("dot gain", intensity, 255);

// create LUT
```

```
        for (int x = 0; x < 256; x++)
        {
                double d = -1;
                for (v = 0; v < 256; v++)
                {
                        double const d2 = BU_Abs(intensity[v] - x);
                        if (d < 0 || d2 < d)
                        {
                                d = d2;
                                lutDotGain[x] = v;
                        }
                }
        }
} static
void
ObtainDotGainTransferFunction
(
        int dotsPerPixel,
        int subdotsPerDot,
        BI_Image const& dotImage,
        char const* pDotImageName,
        char const* pRefDotImageName,
        BI_Image const& ditherMatrix,
        BI_LUT& lutDotGain
)
{
        char lutName[_MAX_PATH];
        ChangeFileSuffix(pRefDotImageName, "", ".amp", lutName);
        try
        {
                BU_File lutFile(lutName, _O_BINARY | _O_RDONLY);
                lutDotGain.Load(lutFile);
        }
        catch (...)
        {
                // if using a reference dot image, LUT must already exist
                if (strcmp(pDotImageName, pRefDotImageName) != 0)
                {
                        fprintf(stderr, "can't load %s\n", lutName);
                        exit(1);
                }
                ComputeDotGainTransferFunction
                (
                        dotsPerPixel,
                        subdotsPerDot,
                        dotImage,
                        pDotImageName,
```

```
                    ditherMatrix,
                    lutDotGain
                );
                BU_File lutFile(lutName, _O_BINARY | _O_WRONLY | _O_CREAT);
                lutDotGain.Save(lutFile);
        }
} static
void
SegmentDither(int argc, char* argv[])
{
        // parse arguments
        if (argc != 12)
                Usage();
        char const* pInputImageName = argv[1];
        int const dotsPerPixel = atoi(argv[2]);
        int const subdotsPerDot = atoi(argv[3]);
        char const* pDotImageName = argv[4];
        char const* pRefDotImageName = argv[5];
        int const overlapCenter = atoi(argv[6]);
        int const overlapSize = atoi(argv[7]);
        int const misregFactor = atoi(argv[8]);
        int const misregSubdots = MisregSubdots(misregFactor, subdotsPerDot);
        char const* pDitherMatrixName = argv[9];
        char const* pOutputImageName = argv[10];
        int const outputResolution = atoi(argv[11]);

// open input image
        BI_Image inputImage;
        BI_LoadImage(inputImage, pInputImageName);
        CHECK_ARGUMENT(inputImage.ColorModel() !=
BI_ColorModel(BI_ColorGrayscale));
        BI_Invert(inputImage); // max is black
        BI_TIFFSetMinIsBlack(false); // max is black // check arguments
        CHECK_ARGUMENT(dotsPerPixel < 1);
        CHECK_ARGUMENT(dotsPerPixel > 16);
        CHECK_ARGUMENT(subdotsPerDot < 1);
        CHECK_ARGUMENT(subdotsPerDot > 32);
        CHECK_ARGUMENT(overlapCenter < 1);
        CHECK_ARGUMENT(overlapCenter >= inputImage.Width() * dotsPerPixel);
        CHECK_ARGUMENT(overlapSize < 0);
        CHECK_ARGUMENT(misregSubdots < -subdotsPerDot / 2);
        CHECK_ARGUMENT(misregSubdots > subdotsPerDot / 2);
        CHECK_ARGUMENT(outputResolution <= 0);

// diagnostics
```

```
        printf("misregSubdots=%d\n", misregSubdots);

// open dot image
        BI_Image dotImage;
        BI_LoadImage(dotImage, pDotImageName);
        CHECK_ARGUMENT(dotImage.ColorModel() !=
BI_ColorModel(BI_ColorGrayscale, 1));
        CHECK_ARGUMENT(dotImage.Height() < subdotsPerDot);
        CHECK_ARGUMENT(dotImage.Width() < subdotsPerDot);
        CHECK_ARGUMENT(dotImage.Height() != dotImage.Width());
        int const dotOverlap = dotImage.Width() - subdotsPerDot;
        CHECK_ARGUMENT((dotOverlap % 2) != 0);

// open dither matrix
        BI_Image ditherMatrix;
        BI_LoadImage(ditherMatrix, pDitherMatrixName);
        CHECK_ARGUMENT(ditherMatrix.ColorModel() !=
BI_ColorModel(BI_ColorGrayscale, 8));
        CHECK_ARGUMENT(ditherMatrix.Height() < 16);
        CHECK_ARGUMENT(ditherMatrix.Width() < 16);

// create output image
        BI_Image outputImage;

// obtain dot gain transfer function for particular dot shape
        BI_LUT lutDotGain;
        ObtainDotGainTransferFunction
        (
                dotsPerPixel,
                subdotsPerDot,
                dotImage,
                pDotImageName,
                pRefDotImageName,
                ditherMatrix,
                lutDotGain
        );

// dither input to bi-level output
        Dither
        (
                inputImage,
                lutDotGain,
                dotsPerPixel,
                subdotsPerDot,
                dotImage,
                pDotImageName,
                pRefDotImageName,
                overlapCenter,
                overlapSize,
```

```
            misregFactor,
            ditherMatrix,
            outputImage,
            outputResolution,
            false,                          // don't retain output image
            false,                          // don't skip LHS
            false                           // don't skip RHS
);
BI_SaveImage(outputImage, pOutputImageName);

// dither input to bi-level output (LHS only)
BI_Image outputImageLHS;
Dither
(
            inputImage,
            lutDotGain,
            dotsPerPixel,
            subdotsPerDot,
            dotImage,
            pDotImageName,
            pRefDotImageName,
            overlapCenter,
            overlapSize,
            misregFactor,
            ditherMatrix,
            outputImageLHS,
            outputResolution,
            false,                          // don't retain output image
            false,                          // don't skip LHS
            true                            // skip RHS
);
BI_SaveImage(outputImageLHS, "OutLHS.tif");

// dither input to bi-level output (RHS only)
BI_Image outputImageRHS;
Dither
(
            inputImage,
            lutDotGain,
            dotsPerPixel,
            subdotsPerDot,
            dotImage,
            pDotImageName,
            pRefDotImageName,
            overlapCenter,
            overlapSize,
            misregFactor,
            ditherMatrix,
            outputImageRHS,
```

```
                    outputResolution,
                    false,                          // don't retain output image
                    true,                           // skip LHS
                    false                           // don't skip RHS
            );
            BI_SaveImage(outputImageRHS, "OutRHS.tif");

// dither input to bi-level output (no interp)
            BI_Image outputImageNoInterp;
            Dither
            (
                    inputImage,
                    lutDotGain,
                    dotsPerPixel,
                    subdotsPerDot,
                    dotImage,
                    pDotImageName,
                    pRefDotImageName,
                    overlapCenter,
                    overlapSize,
                    misregFactor,
                    ditherMatrix,
                    outputImageNoInterp,
                    outputResolution,
                    false,                          // don't retain output image
                    false,                          // skip LHS
                    false,                          // don't skip RHS
                    true,                           // fixed interp
                    0,                              // f0
                    0                               // f1
            );
            BI_SaveImage(outputImageNoInterp, "OutNoInterp.tif");
} void
main(int argc, char* argv[])
{
            try
            {
                    SegmentDither(argc, argv);
            }
            catch (BU_Error error)
            {
                    error.Print();
            }
            exit(0);
}
```

The invention claimed is:

1. A method of generating halftone print data for overlapping end portions of a pair of consecutive printhead segments in an array of two or more printhead segments where an end portion of a first printhead segment overlaps an end portion of a second printhead segment, each printhead segment including a plurality of ink ejection nozzles, the method comprising the steps of:

determining an extent of overlap of the end portions,
   generating a dither value from a dither matrix;
   combining the dither value with an overlap signal to produce an output value, the overlap signal being dependent upon the extent of overlap; and
   performing a mathematical operation on continuous tone print data based on the output value, to produce the half tone data.

2. The method as claimed in claim 1, wherein combining the dither value with the overlap signal is achieved by inputting the dither value and the overlap signal to an adder.

3. The method as claimed in claim 1, further comprising the step of multiplying the overlap signal by a calibration factor prior to combining the dither value with the overlap signal.

4. The method as claimed in claim 1, further comprising the step of adding a calibration offset factor to the overlap signal prior to combining the dither value with the overlap signal.

5. The method as claimed in claim 1, further including interpolating the continuous tone print data for the overlapping end portions according to an algorithm such that ink ejection nozzle utilization decreases in each of the overlapping end portions towards respective ends of the printhead segments.

6. The method as claimed in claim 5, wherein a linear interpolation is applied.

7. The method as claimed in claim 5, wherein a second order or higher interpolation is applied.

8. The method as claimed in claim 1, in which generating the overlap signal includes the step of measuring a temperature of the printhead segments to determine an extent of thermal expansion or contraction of the printhead segments.

9. The method as claimed in claim 1, in which generating the overlap signal includes the step of determining relative displacement of the printhead segments using fiducial strips positioned on the printhead segments and an interferometric technique.

10. The method as claimed in claim 1, wherein the dither matrix is registered at the nozzle level.

11. The method as claimed in claim 1, wherein the mathematical operation is a comparison of the continuous tone print data and the output value.

12. The method as claimed in claim 1, wherein the mathematical operation is subtraction of the continuous tone print data and the output value.

* * * * *